United States Patent
Malkamaki et al.

(10) Patent No.: US 9,763,231 B2
(45) Date of Patent: Sep. 12, 2017

(54) FIXED HS-DSCH OR E-DCH ALLOCATION FOR VOIP (OR HS-DSCH WITHOUT HS-SCCH/E-DCH WITHOUT E-DPCCH)

(71) Applicant: Core Wireless Licensing S.a.r.l., Luxembourg (LU)

(72) Inventors: Esa Malkamaki, Espoo (FI); Markku Kuusela, Espoo (FI)

(73) Assignee: CORE WIRELESS LICENSING S.A.R.L., Luxembourg (LU)

( * ) Notice: Subject to any disclaimer, the term of this patent is extended or adjusted under 35 U.S.C. 154(b) by 0 days.

(21) Appl. No.: 14/330,211

(22) Filed: Jul. 14, 2014

(65) Prior Publication Data

US 2014/0321404 A1 Oct. 30, 2014

Related U.S. Application Data

(63) Continuation of application No. 11/411,995, filed on Apr. 25, 2006, now Pat. No. 8,804,505.

(Continued)

(51) Int. Cl.
*H04W 72/04* (2009.01)
*H04L 12/801* (2013.01)
(Continued)

(52) U.S. Cl.
CPC ....... *H04W 72/0413* (2013.01); *H04L 1/0027* (2013.01); *H04L 47/14* (2013.01);
(Continued)

(58) Field of Classification Search
CPC . H04W 72/0413; H04W 72/04; H04W 28/18; H04W 28/06
See application file for complete search history.

(56) References Cited

U.S. PATENT DOCUMENTS 5,701,294 A 12/1997 Ward et al.
6,282,430 B1 8/2001 Young
(Continued)

FOREIGN PATENT DOCUMENTS

CN 1476693 A 2/2004
EP 1372300 A1 12/2003
(Continued)

OTHER PUBLICATIONS

Mexican Office Action dated Apr 22, 2010 in parallel Mexican Patent No. MX/A2007/0132690 (4 pp.) together with English Translation there of (2 pp.).

(Continued)

*Primary Examiner* — Lakeram Jangbahadur
(74) *Attorney, Agent, or Firm* — Core Wireless Licensing Ltd.

(57) ABSTRACT

In order to reduce the HS-SCCH overhead, a fixed time allocation approach could be used. In that case, the scheduling time of each VoIP user is semi-static and thus there is no need to transmit e.g. HS-SCCH toward the UE for the initial transmissions, if the UE knows when to receive data on the HS-DSCH and what transport format is used. There are at least two ways of implementing this: 1) HS-SCCH/E-DPCCH signalling to indicate parameters of a first transmission, with subsequent transmissions using the same parameters (and HS-SCCH/E-DPCCH always sent when changes needed), or 2) fixed allocation, RRC signalling used to allocate users and tell the default transport parameters.

10 Claims, 6 Drawing Sheets

Related U.S. Application Data (60) Provisional application No. 60/675,127, filed on Apr. 26, 2005.

(51) Int. Cl.

| | | |
|---|---|---|
| *H04L 12/861* | (2013.01) | |
| *H04W 28/06* | (2009.01) | |
| *H04L 1/00* | (2006.01) | |
| *H04W 28/18* | (2009.01) | |
| *H04W 76/04* | (2009.01) | |
| *H04W 80/00* | (2009.01) | |

(52) U.S. Cl.
CPC ............ *H04L 47/34* (2013.01); *H04L 49/90* (2013.01); *H04L 49/9094* (2013.01); *H04W 28/06* (2013.01); *H04W 72/042* (2013.01); *H04W 28/18* (2013.01); *H04W 76/04* (2013.01); *H04W 80/00* (2013.01)

(56) References Cited

U.S. PATENT DOCUMENTS

| | | | |
|---|---|---|---|
| 6,389,038 | B1 | 5/2002 | Goldberg et al. |
| 6,542,504 | B1 | 4/2003 | Mahler et al. |
| 8,804,505 | B2 | 8/2014 | Malkamaki et al. |
| 2003/0002472 | A1 | 1/2003 | Choi et al. |
| 2004/0047425 | A1 | 3/2004 | Itoh |
| 2004/0162083 | A1* | 8/2004 | Chen .................. H04W 52/286 455/454 |
| 2004/0187064 | A1 | 9/2004 | Takahashi et al. |
| 2005/0018656 | A1* | 1/2005 | Rudolf ................ H04W 52/08 370/352 |
| 2005/0063330 | A1 | 3/2005 | Lee et al. |
| 2005/0073985 | A1 | 4/2005 | Heo et al. |
| 2005/0075124 | A1* | 4/2005 | Willenegger ......... H04W 52/40 455/522 |
| 2005/0117553 | A1* | 6/2005 | Wang .................. H04B 7/2618 370/338 |
| 2005/0213605 | A1 | 9/2005 | Kim et al. |
| 2005/0257118 | A1 | 11/2005 | Shien |
| 2005/0265373 | A1 | 12/2005 | Khan |
| 2006/0014505 | A1 | 1/2006 | Hiraki |
| 2006/0111133 | A1 | 5/2006 | Hirano et al. |
| 2006/0120404 | A1 | 6/2006 | Sebire et al. |
| 2006/0159061 | A1 | 7/2006 | Takano et al. |
| 2006/0165028 | A1 | 7/2006 | Hiraki et al. |
| 2011/0134787 | A1 | 6/2011 | Hirano et al. |

FOREIGN PATENT DOCUMENTS

| | | |
|---|---|---|
| EP | 1480481 A1 | 11/2004 |
| EP | 1511221 A1 | 3/2005 |
| EP | 1601224 A2 | 11/2005 |
| JP | 2003-115796 | 4/2003 |
| JP | 2003188988 | 7/2003 |
| JP | 2005-064751 A | 3/2005 |
| JP | 2004-289234 | 11/2006 |
| WO | 2004-073200 A1 | 8/2004 |
| WO | 2004073200 A1 | 8/2004 |
| WO | 2004095860 A1 | 11/2004 |
| WO | 2006-038078 A2 | 4/2006 |
| WO | 2003-096731 A1 | 11/2006 |

OTHER PUBLICATIONS

Chinese Office Action dated Apr 26, 2011 in parallel Chinese Patent Application No. 200680014086.7 (3 pp.) and English Translation thereof (4 pp.) (7 pp. total).

Taiwan Office Action, Search Report in parallel R.O.C. Patent Application No. 95114948 dated Dec 10, 2012 (10 pp.) and an English translation of the TW Search Report (1 p.) (11 pp. total).

Malaysian Office Action (adverse Examination Report) in parallel MY patent application No. PI 20061935 dated Oct 24, 2012 (2 pp.).

Philippines Office Action (Office Action Paper No. 17) in parallel PH patent application No. 1-2007-502235 dated Feb 15, 2013 (2 pp.).

* cited by examiner

FIXED HS-DSCH OR E-DCH ALLOCATION FOR VOIP (OR HS-DSCH WITHOUT HS-SCCH/E-DCH WITHOUT E-DPCCH)

CROSS-REFERENCE TO RELATED APPLICATIONS

This application is a continuation of U.S. patent application Ser. No. 11/411,995, filed Apr. 25, 2006, which claims the benefit under 35 U.S.C. §119(e) of U.S. Provisional Patent Application No. 60/675,127, filed Apr. 26, 2005, both of which are incorporated by reference in their entireties.

BACKGROUND OF THE INVENTION

1. Technical Field

The field of the invention is mobile communications and, more particularly, to Voice over IP (VoIP) and other real time services for WCDMA (Wideband Code Division Multiple Access) HSDPA (High-Speed Downlink Packet Access) and HSUPA (High-Speed Uplink Packet Access).

2. Discussion of Related Art

The invention relates to the 3GPP (Third Generation Partnership Project) specification of the Universal Mobile Telecommunications System (UMTS) Terrestrial Radio Access (UTRA) and more specifically to the Wideband Code Division Multiple Access (WCDMA) High Speed Downlink Packet Access (HSDPA) which is an enhanced downlink feature used in the Frequency Division Duplex (FDD) mode. This feature is specified in the 3GPP release 5.

We describe the invention here using the downlink (HSDPA) as an example. However, the invention can also be used in the uplink (HSUPA). High Speed Uplink Packet Access (HSUPA) is an enhanced uplink feature which may be used in the Frequency Division Duplex (FDD) mode. This feature is being specified in the 3GPP and targeted to 3GPP release 6. The invention is not limited to the specific context described, however.

HSDPA and HSUPA are designed for high speed data and therefore the associated control overhead is not a problem when high data rates are used. When introducing for instance a relatively low bit rate VoIP or other real time service on top of HSDPA and HSUPA, however, the control overhead becomes a major problem. There are other types of services where this can be a problem as well.

For HSDPA, the downlink shared control channels (HS-SCCH) consume channelization codes as well as downlink transmission power, thus reducing the voice capacity. HS-SCCH is used to tell the UE (User Equipment) when (timing) and on which codes the UE will receive communications on a shared data channel HS-DSCH. Also, the transmission format is indicated to the UE on HS-SCCH. HS-SCCH signalling is purely physical (/MAC) layer signalling, telling the UE the following parameters: UE id (intended recipient of the control on HS-SCCH and data on data channel (HS-DSCH)), modulation scheme and channelization codes used on data channel, transport block sizes (TBS), HARQ (Hybrid Automatic Repeat request) process id, HARQ redundancy and constellation version and NDI (new data indicator).

HS-SCCH(s) (there can be several of these and one UE can be configured to receive a maximum of four HS-SCCHs) are sent to the UE on separate (from data channels) code channels two slots earlier than corresponding HS-PDSCHs. The UE reads the HS-SCCHs and tries to find its UE id. When UE finds its UE id from one of the HS-SCCHs, then UE reads the transport format parameters and demodulates and decodes the corresponding HS-PDSCHs based on these parameter values. According to current 3GPP specifications, HS-SCCH is sent with every data packet sent on HS-DSCH.

For HSUPA, E-DPCCH (Enhanced Dedicated Physical Control Channel) tells the transmission format (transport block size). It is consuming some capacity but is not as big a problem as HS-SCCH in the downlink. E-DPCCH is a dedicated control channel which is power controlled whereas HS-SCCH as a shared channel typically requires higher transmission power. According to current 3GPP specification, E-DPCCH is always sent together with E-DPDCH (Enhanced Dedicated Physical Data Channel), i.e., no data is sent on E-DPDCH without associated signalling on E-DPCCH.

One way of solving the problem is by transmitting several VoIP or other real time type or other small packets for a user at the same time, which increases the data rate and reduces control overhead. This is one way of reducing HS-SCCH overhead and is already possible with the current specification.

Use of a multiuser packet is another way of reducing HS-SCCH overhead: VoIP or like packets from multiple users are combined into one HS-DSCH packet and only one HS-SCCH is sent. A similar approach is specified for the 1x-EV DO system.

The current invention is independent from the above described solutions and can also be used together with them.

DISCLOSURE OF INVENTION

The invention concerns reducing signalling.

For instance, in order to reduce the HS-SCCH overhead, a fixed time allocation approach could be used to reduce the HS-SCCH overhead. In that case, the scheduling time of each VoIP (or other real time type service) user is semi-static and thus there is no need to transmit HS-SCCH for the first transmissions, if the user knows when to receive data on HS-DSCH and what the used transport format is.

There are several ways implementing this, such as the following two alternatives:

1) HS-SCCH/E-DPCCH signalling to indicate parameters of the first transmission, and subsequent transmissions including re-transmissions use the same parameters (and HS-SCCH/E-DPCCH are sent only when changes are needed)
2) fixed allocation, RRC (Radio Resource Control) signalling is used to allocate users and tell the default transport parameters In the Detailed Description Section below, we mainly describe the first alternative which is more dynamic in the sense that the stored parameters can be changed on-the-fly. The second alternative is more semi-static since RRC signalling is used to send the parameters to be stored and used when no HS-SCCH is sent (RRC signalling would be slower and changed less often).

BEST MODE FOR CARRYING OUT THE INVENTION

Figure 1:
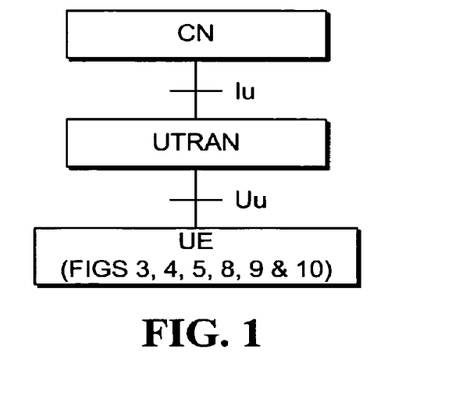
FIG. 1 shows the packet network architecture for the Universal Mobile Telecommunications System (UMTS) in which the invention may be used.

Referring to FIG. 1, the Universal Mobile Telecommunications System (UMTS) packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network over a (wired) Iu interface. The UE of FIG. 1 could take the form of the device shown in FIG. 3 operating for instance according to the flow chart of FIG. 4 or FIG. 5, according to the invention. Similarly, the UTRAN could include a network element having the form shown in FIG. 3 operating according to the flow chart of FIG. 4, for instance.

Figure 2:
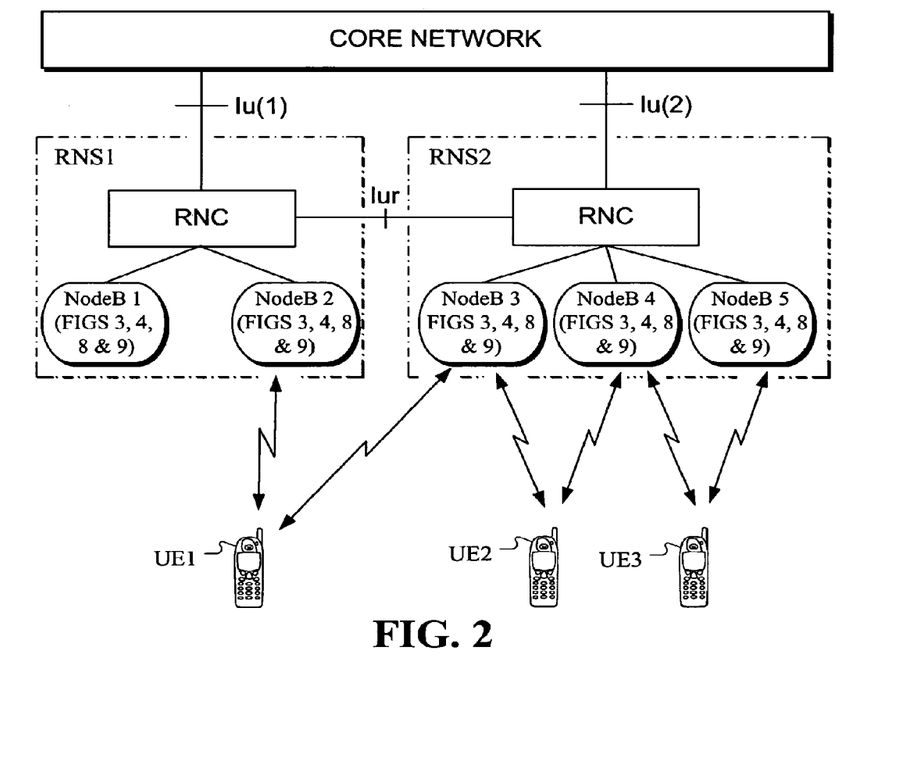
FIG. 2 shows some further details of the overall architecture of the UMTS in which the invention may be used.

FIG. 2 shows some further details of the architecture, particularly the UTRAN. The UTRAN includes multiple Radio Network Subsystems (RNSs), each of which contains various network elements including at least one Radio Network Controller (RNC). Each RNC may be connected to multiple Nodes B which are the UMTS counterparts to GSM base stations. As suggested above, one or more of the Nodes B of FIG. 2 could take the form of the device shown in FIG. 3, according to the invention, operating according to the flowchart of FIG. 4, for example. Each NodeB may be in radio contact with multiple UEs via the radio interface (Uu) shown in FIG. 1. A given UE may be in radio contact with multiple Nodes B even if one or more of the Nodes B are connected to different RNCs. For instance a UE1 in FIG. 2 may be in radio contact with NodeB 2 of RNS 1 and NodeB 3 of RNS 2 where NodeB 2 and NodeB 3 are neighboring Nodes B. The RNCs of different RNSs may be connected by an Iur interface which allows mobile UEs to more easily stay in contact with both RNCs while traversing from a cell belonging to a NodeB of one RNC to a cell belonging to a NodeB of another RNC. One of the RNCs will act as the "serving" or "controlling" RNC (SRNC or CRNC) while the other will act as a "drift" RNC (DRNC). A chain of such drift RNCs can even be established to extend from a given SRNC. The multiple Nodes B will typically be neighboring Nodes B in the sense that each will be in control of a cell in a corresponding chain of neighboring cells. The mobile UEs are able to traverse the neighboring cells without having to re-establish a connection with a new NodeB because either the Nodes B are connected to a same RNC or, if they are connected to different RNCs, the RNCs are connected to each other. During such movements of a UE, it is sometimes required that radio links be added and abandoned so that the UE can always maintain at least one radio link to the UTRAN. This is called soft-handover (SHO).

Figures 3, 8:
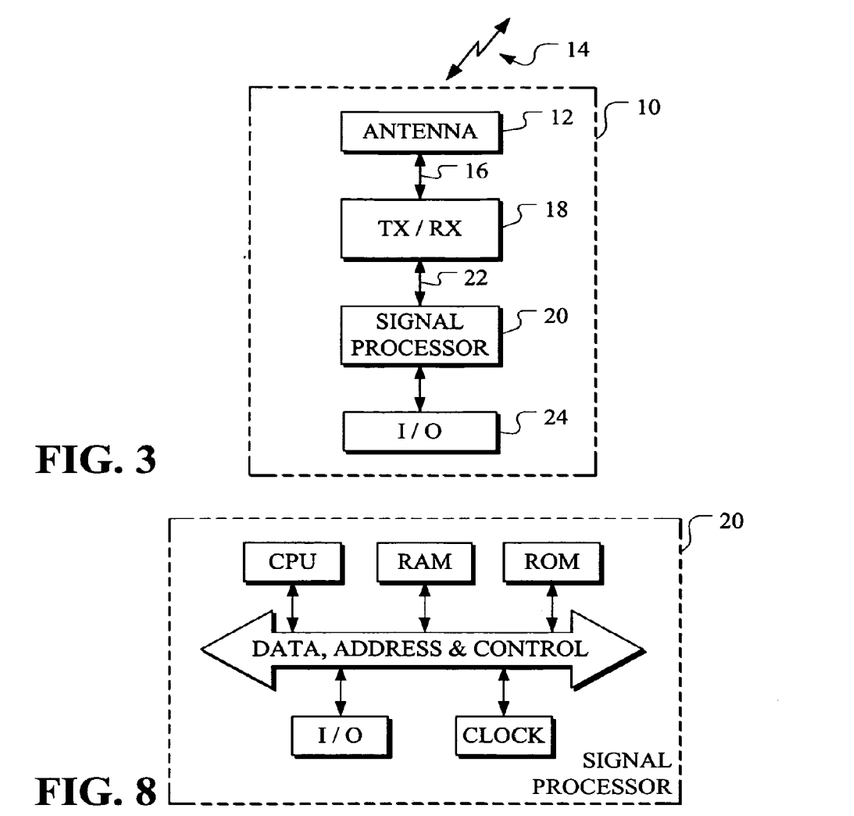
FIG. 3 shows a device 10, according to the present invention, which could be for instance the UE of FIG. 1 or one of the Node B's of the UTRAN (see FIG. 2).
FIG. 8 shows a general purpose signal processor embodiment of the signal processor of FIG. 3.

FIG. 3 shows a device 10, according to the present invention, which could be for instance the UE of FIG. 1 or one of the Nodes B of the UTRAN (see FIG. 1 and FIG. 2). The device 10, may include an antenna 12 for providing an interface to a radio link 14 connecting the device 10 to another, similar device. For instance, if the device 10 is a UE the radio link 14 may be terminated at a Node B. For another instance, if the device 10 is a Node B the radio link 14 may be terminated at a UE. The antenna is connected by a signal on a line 16 to a transmitter/receiver 18 which is in turn connected to a signal processor 20 by a signal on a line 22. The device 10 may be connected to other devices by an input/output device 24 connected to the signal processor 20 by a signal on a line 26. If the device 10 of FIG. 3 is a Node B then the input/output device 24 may be connected by means of an Iub interface to a radio network controller. The RNC controls the Node B over the Iub interface to allow negotiation of radio resources, the adding and deleting of cells controlled by the individual Node B, or the supporting of the different communication and control links. If the device 10 of FIG. 3 is a UE then the input/output device 24 might be connected to a microphone, a keypad, a trackball or the like as well as a display, loudspeaker and other output devices. The input/output device might be connected to other types of devices as well such as a laptop computer. It could also be understood as being a service interface to higher layers of the device.

The signal processor 20 of FIG. 3 may be implemented in a variety of ways. for instance, it could be implemented as an integrated circuit designed for a specific device 10 and mass-produced to achieve economy of scale. Or, it could be a general purpose signal processor having an architecture comprising for instance as shown in FIG. 8 a central processing unit, a random access memory, a read-only memory, an input/output port, a clock, etc., all interconnected by data, address and control lines. In that case, the steps shown in FIG. 4 or 5 would be carried out by computer program code stored in the read-only memory and executed by the central processing unit using the random access memory for storing intermediate data, temporary results of computations, input/output data, etc. Coded instructions such as described above can also be used as a starting point for constructing the design of an integrated circuit such as also described above for mass production. Or, the coded instructions can be stored on a computer readable medium as a computer program product for execution by a computer or CPU in a device such as a UE or Node B in which the computer program product is installed.

Figure 4:
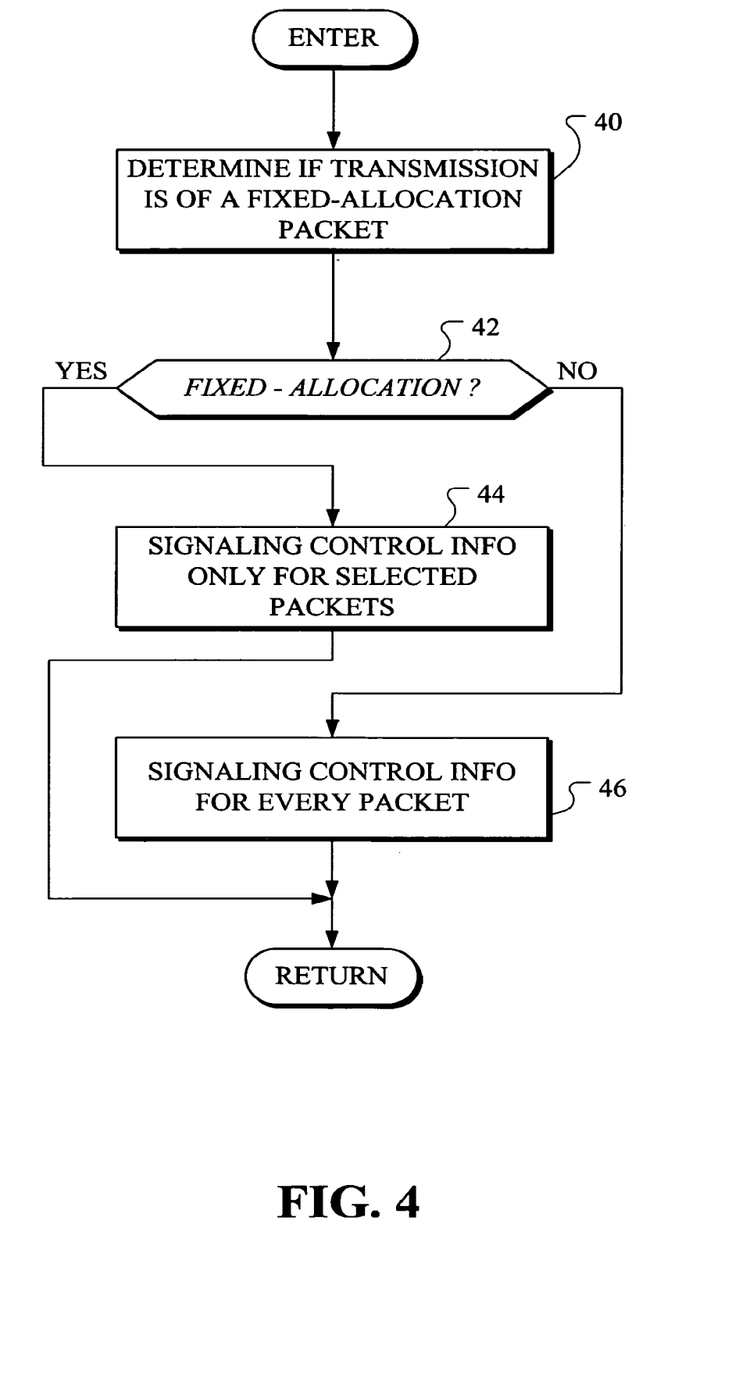
FIG. 4 shows a flow chart which may be executed by the signal processor 20 of FIG. 3 in carrying out the present invention, regardless of whether the device 10 is a Node B or a UE.

FIG. 4 shows a flow chart which may be executed by the signal processor 20 of FIG. 3 in carrying out the present invention, regardless of whether the device 10 is a Node B network element type device or a UE terminal type device. The method illustrated by the flow chart is for use in a device of wireless telecommunications system, such as the device 10 of FIG. 3, for signalling control information on a signalling channel of a radio interface 14 between a device such as a mobile station (for instance a UE) and a device such as a radio access network element (for instance a Node B), said control information concerning transmission of packets on a shared data channel carrying both packets for which a fixed allocation is configured and normal packets without fixed allocation. The term fixed allocation should be understood as broadly covering both the timing and the transport parameters. It should also be understood as covering the case where the timing is not fixed but only the transport parameters are fixed (default values).

The method may include a step 40 of determining if the transmission of packets is for fixed allocation packets. If such is determined to be true in a step 42, a step 44 is executed to signal control information on the signaling channel but only for selected packets. This avoids excessive signalling of the control information for every small packet. Thus, if a normal packet is to be sent, as determined in the step 42, the control information is signaled for every such normal packet, as shown in a step 46. The fixed allocation principle would in practice be configured for one or more logical channels or MAC-d flows. Thus this invention would only be applied for packets sent on these logical channels or MAC-d flows. Here we call those packets 'fixed allocation packets' and other packets 'normal packets.' Non-limiting examples of the types of packets which would naturally fall within the fixed allocation type would be real time or delay-sensitive data packets while delay-insensitive data packets could fall within the normal type.

Of course, it should be realized that the step 40 is equivalent to determining if a transmission is of a normal packet (i.e., not a fixed allocation packet). In that case, the decision step 42 could stay the same or change to determine if the packet is a normal packet or not. If so, the step 46 would be executed and, if not, the step 44. Thus, such variations are merely semantical and are equivalent.

Figure 6:
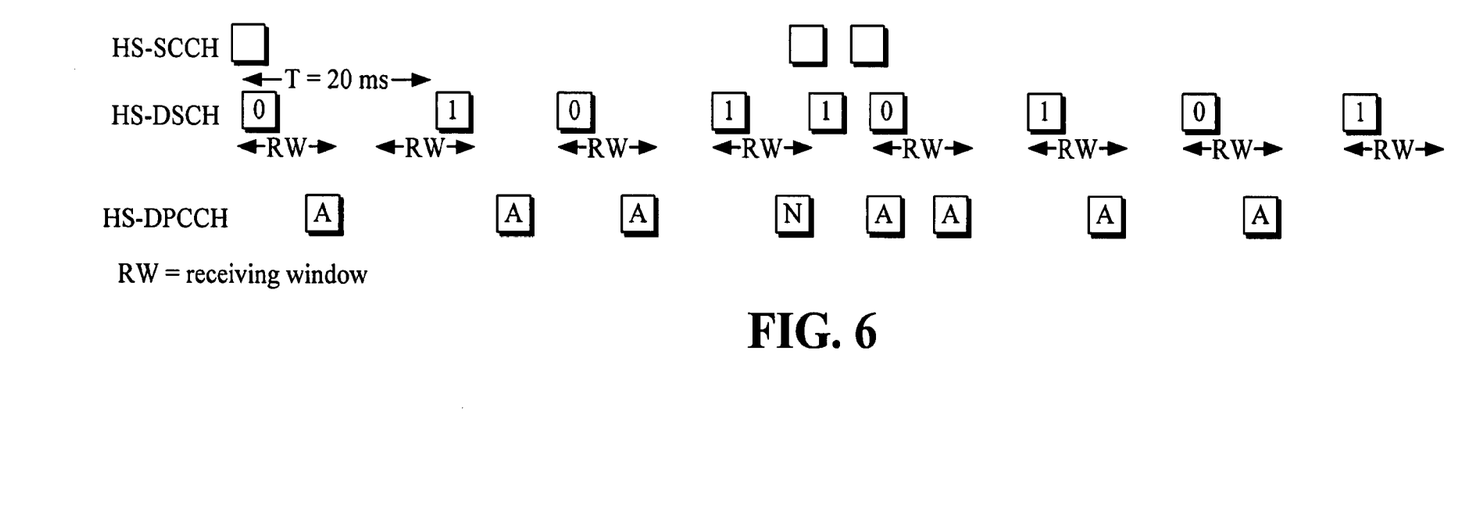
FIG. 6 illustrates a fixed allocation scheme showing the basic concept and periodicity, with a receive window (RW).
Figure 7:
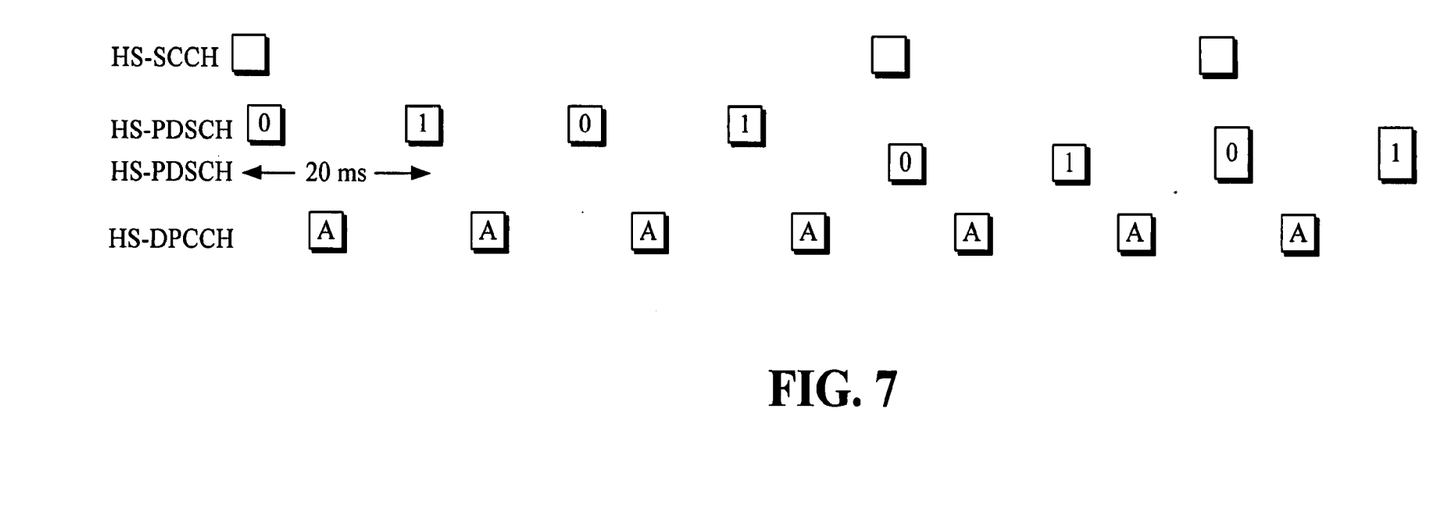
FIG. 7 illustrates a fixed allocation scheme showing change of channelization code or transport block size.

It should also be realized that the signaling steps 44, 46 of FIG. 4 are paralleled by data transmission, i.e., the sending of actual payload packets for use by the user in some chosen application. Although the transmission of packets in a data channel is not explicitly shown in FIG. 4, it is shown in FIGS. 6 and 7 to be described below.

The radio link 14 of FIG. 3 can also be understood as an illustration of a transmission of data packets on a data channel in parallel with signaling.

Figure 9:
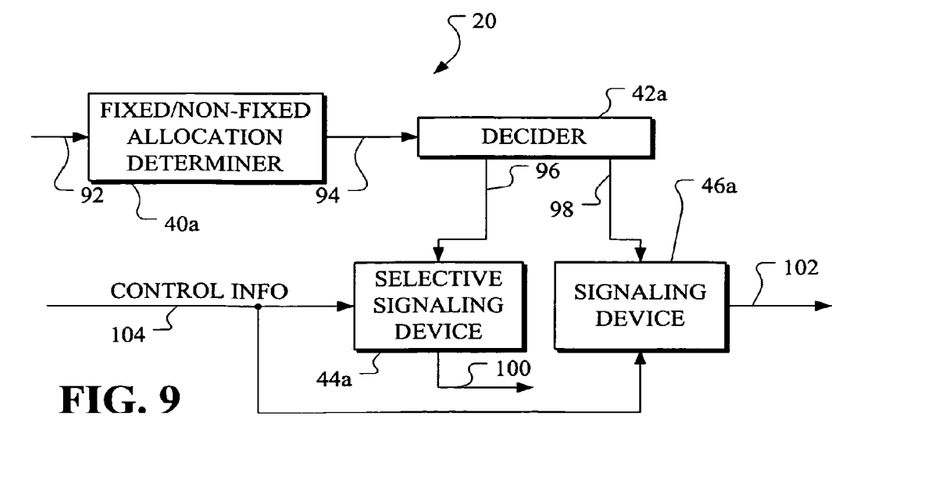
FIG. 9 shows a device embodying the architecture required to carryout the steps of FIG. 4 in either software or hardware.

FIG. 9 shows another variation of the signal processor 20 of FIG. 3 based on the flow chart of FIG. 4. The steps of FIG. 4 are shown with similar reference numerals in FIG. 9 illustrating modules for carrying out the functions shown in FIG. 4. Thus, the signal processor 20 of FIG. 9 can be viewed as a hardware embodiment of the software implemented embodiment of the invention shown in FIGS. 4 and 8. As such, it includes a fixed/non-fixed allocation determiner 40a corresponding to the step 40 of FIG. 4. It is responsive to a signal on a line 92 indicative of whether the information to be transmitted is fixed allocation (e.g., delay-sensitive) or non-fixed allocation (e.g., delay-insensitive) data packets, or the like. Once the determiner 40a determines whether the packets to be sent are fixed allocation (e.g., real time/delay-sensitive) or non-fixed allocation (e.g., delay-insensitive) data packets of the normal type, it sends a signal on a line 94 indicative of the determination of what type is involved. A decider module or element 42a is responsive to the signal on the line 94 for deciding whether the signaling transmission is to be only for selected fixed allocation data packets so as to avoid signaling the control information for every fixed allocation data packet as is done for normal packets or whether the signaling is to be for every data packet as in the normal case. Depending on the result of the decision, the decider 42a sends either a signal on a line 96 to a selective signaling device 44a or a signal on a line 98 to a signaling device 46a. Of course, it should be realized that the signaling device 44a and the signaling device 46a may be the same module which changes its internal structure depending on whether it receives the signal on the line 96 or the signal on the line 98 for purposes of providing a signaling output signal either on a line 100 or a line 102 from the respective signaling devices 44a or 46a. In response to the signal on the line 96, the selective signaling device 44a sends a selective signaling output signal on a line 100 which is not sent for every fixed allocation (e.g., real time or delay-sensitive) data packet because of the invention which signals control information on the signaling channel only for selected fixed allocation data packets so as to avoid signaling the control information for every fixed allocation data packet. The processor 20 of FIG. 9 is shown being responsive to a control information signal on a line 104 supplied to both the selected signaling device 44a and the normal signaling device 46a. If the decider 42a outputs a decision signal on the signal line 98 indicative of normal (e.g., delay insensitive) packets about to be transmitted, the signaling device 46a responds thereto by signaling the control information on the signal line 104 on the output signal line 102 signaling the control information for every normal data packet. It should be appreciated that the modules shown in FIG. 20 can be viewed as the architecture of an integrated circuit or a component part of an integrated circuit in which the present invention is embodied. Similarly, for a software or computer program product embodiment, the module shown in FIG. 9 can be viewed as the overall architecture of the code modules used to implement the flow chart of FIG. 4. Many other physical embodiments of the invention are of course possible besides those described.

As pointed out above, the device of FIG. 3 could be a UE or a network element such as a Node B.

The detailed description which follows describes the downlink (HSDPA) as an example. It should be kept in mind, however, that the invention can also be used in the uplink (HSUPA) and also that the invention is not limited to the embodiments shown.

Alternative 1, Fixed Allocation Using Last Successful HS-SCCH for HSDPA

One possible HSDPA implementation is to require that the UE tries to decode the HS-DSCH using the parameters received in the last successful transmission of HS-SCCH and HS-DSCH. Thus all the retransmissions would use HS-SCCH and also new transmissions after retransmissions, and naturally all transmissions with changed parameters.

Figure 5:
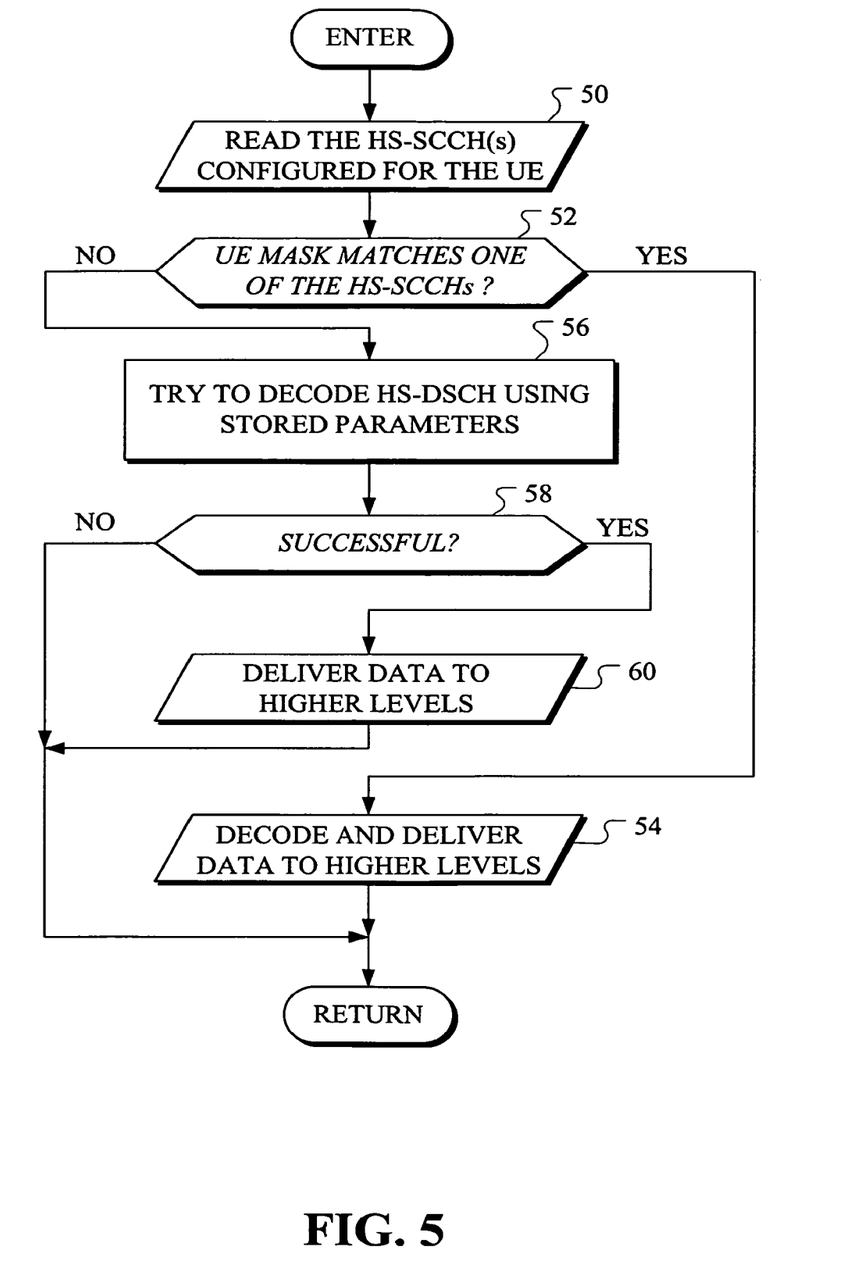
FIG. 5 is a flowchart illustrating steps that may be carried out by the signal processor of FIG. 3 with the device acting as a UE receiving a HS-DSCH.

The UE operation for HS-DSCH reception, as shown in FIG. 5, could for example be the following:
1) Read the HS-SCCH(s) configured for the UE (max 4) (prior art step 50)
2) If the UE mask of one of HS-SCCHs matches, decode HS-DSCH using parameters from that HS-SCCH (prior art step 52 & 54)
3) If none of the HS-SCCHs is for this UE, (try to) decode HS-DSCH using stored parameters from latest successful HS-SCCH (step 56 of the invention)
4) If it is determined in step 58 not to be successful, a return may be made and, for instance, another attempt to read the SCCHs could be made by re-entering the routine of FIG. 5 and re-executing its steps again, If it is determined in a step 58 that decoding of HS-DSCH is successful (based on UE specific CRC (new)), data is delivered in a step 60 to higher layers and the transport format parameters used are confirmed to be successful (and stored to be used again for next reception) (invention).

There are several possibilities for the definition of the latest successful HS-SCCH (step 3 above (step 56 in FIG. 5)):
1) Latest successful HS-SCCH, i.e., UE keeps in a memory location the parameters from the latest successful reception of HS-SCCH and updates that memory location every time a new HS-SCCH is received successfully (this can be for any HARQ process or only for a specific HARQ process).

2) Higher layer (RRC) signalling is used to tell the UE of a periodicity parameter T (ms) and the transport format parameters from a successfully decoded HS-SCCH received T ms before current time instant are used (preferred for VoIP).

For VoIP, the periodicity parameter T could be set to, e.g., 20 or 40 ms (depending on the scheduling scheme used). When the UE receives/decodes HS-SCCH (and corresponding HS-DSCH) correctly, it stores the transport format parameters (modulation scheme, channelization codes, HARQ process id, redundancy and constellation version, and transport block size) received on HS-SCCH and tries to reuse these parameters after T ms. If the decoding of HS-DSCH is successful (using the stored parameters), these parameters are kept in the memory and reused again after T ms.

HS-SCCH(s) would always be decoded first. If one of them is for the UE, the new parameters will override the (T ms before) stored values (and the new values will be stored for future use). Not only will the new parameter values override the stored values, but also values received for the same HARQ process id (provided that it is initial transmission, i.e., not a retransmission). This is because the HARQ process id is one of the parameters sent on HS-SCCH and the fixed allocation assumes that the same parameter values are used after T ms. In practice, this means that the same HARQ process should always be used for VoIP if this fixed allocation scheme is to be used. In order to save in UE memory and operations, this HARQ process id used for fixed allocation could also be signalled by higher layers (RRC). Thus the UE would only store the HS-SCCH parameter values sent for this particular HARQ process.

Figure 10:
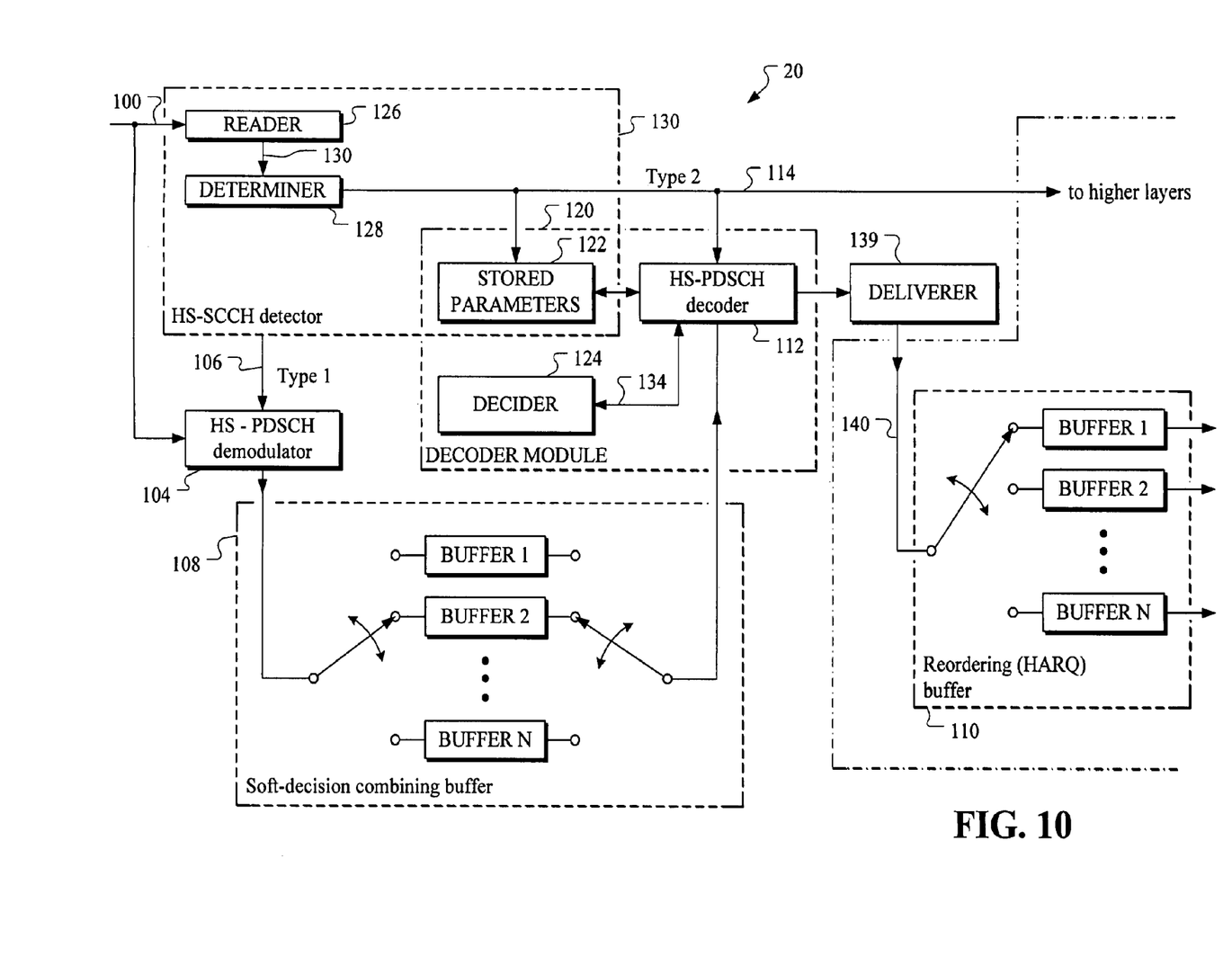
FIG. 10 shows a simplified HSDPA user equipment receiver according to the present invention.

FIG. 10 shows another embodiment of the signal processor 20 of FIG. 3, this time shown for implementation in user equipment. In the figure a digitized samples signal on a line 100 from a radio card are provided into a number of receiver blocks including an HS-SCCH detector 130 and an HS-PDSCH demodulator 104. The HS-PDSCH demodulator 104 receives a signal on a line 106 indicative of the modulation type (e.g., QPSK or 16 QAM) and the channelization code number in order to demodulate the data packet successfully. This information is provided by the detector 130 on the signal line 106 and includes information taken from the first slot of the HS-SCCH packet which is currently classified as having three slots with a total duration for the three slots of two milliseconds. The demodulator 104 despreads the data carried on the HS-PDSCH received on the line 100. The demodulator 104 converts the despread signals into soft decisions as shown utilized in a soft-decision combining buffer 108. It should be understood that there are a number of different HARQ processes going on because some applications may need data in each process in a correct (sequential) order. Since one series of data blocks can become available before another process due to the scheduling being influenced by the state of the propagation channel, the user equipment needs to reorder the incoming data using a reordering buffer 110 as part of the Medium Access Control (MAC). This process is assisted by an HS-PDSCH decoder 112 which tries to decode the HS-DSCH data in the buffers of the soft-decision combining buffer using the signalling information appearing on a signal on a line 114 indicative of the signalling information in slots 2 and 3 of the SCCH. This would include the transport block size and the HARQ-related information. It will be understood that the signalling information on the line 114 is separately convolutionally encoded from the signalling information appearing on the line 106, i.e., as it comes in on the digitized samples received on the line 100. The signalling information on the line 106 is sometimes referred to as part 1 of the HS-SCCH because it is in the first slot of the three slot TTI of two milliseconds used for HSDPA. Part 2 information on the line 114 is in the second and third slots of the SCCH TTI. For purposes of the present invention, the HS-PDSCH decoder 112 is shown within a decoder module 120 which also includes a memory 122 and a decider 124. The memory 122 is shown as being shared between the HS-SCCH detector 130 and the decoder module 120 since the stored parameters may also be useful for Part 1 signalling storage. The memory could also or instead be stored with the HS-PDSCH demodulator 104 depending on design choice. In any event, the stored parameters will also be available for use in determining the parameters to use for Part 1 signalling as well. The HS-SCCH detector 130 is shown in FIG. 10 as a module having a reader component 126 and a determiner component 128. The reader 126 is responsible for receiving the various HS-SCCHs which are sent from the Node B over a wide area to various mobile stations in a single transmission. The reader sends an indication of the part 1 signalling information received from the Node B as a signal on a line 130 to a determiner 128 which uses a mask for the particular user equipment in which the processor 20 is installed to find out if one of the HS-SCCHs matches the UE in question. If so, it signals that information on a signal on a line 106 to the demodulator 104. Similarly, the determiner will send a signal indication of the part 2 signalling information on the line 114 to both higher layers of the user equipment and to the decoder module 120. The decoder 112 will try to decode the HS-DSCH in one of the buffers of the soft-decision combining buffer 108 using either the part 2 signalling information on the line 114 or the an earlier version thereof stored in the memory 122. The decision of whether to use the newly incoming part 2 signalling information on the line 114 or the stored parameters in the memory 122 is made by a decider 124 based on whether the incoming SCCH signalling information matches the user equipment in question. The decider is shown in communication by a signal on a line 134 with the decoder 112 but may also be in communication with other entities or modules such as the HS-PDSCH demodulator or the HS-SCCH detector modules. In other words, the decision made by the decider 124 is similar to the decision step 52 of FIG. 5 and it may be in direct communication with the HS-SCCH detector 130 rather than simply the decoder 112 as shown in FIG. 10. In any event, if it is determined that the incoming signalling on the line 114 is for the UE in question, then the decoder 112 will use that new information rather than that stored in the memory 122. Thus, if the decider 124 follows the path shown in FIG. 5 from the decision block 52 to the step 56, then the decoder 112 will try to decode the HS-DSCH information in the buffer 108 using the parameters stored in the memory 122. If successful, the data decoded will be delivered by a deliverer 139 on a line 140 to the reordering buffer 110 as shown by a signal on a line 140 in FIG. 10. If not, a return may be made for instance according to FIG. 5. Thus, the decoder module 120 will include a decider for carrying out the function shown by the decision block 58 of FIG. 5. This could be carried out by the decider 124 or the decoder 112, for instance. In any event, the decoder module 120 will be able to decode the HS-DSCH information in the buffer 108, whether the Node B sends an SCCH signal for the UE or not in a given TTI of the HS-SCCH. It should be realized that one or more of the modules shown in FIG. 10 can be incorporated into an integrated circuit with the desired functionality. For example, the decoder 112 can be embodied in an integrated circuit by itself or along with the other modules shown in the decoder module 120. Moreover, the decoder 112 may be combined with other modules shown in FIG. 10 into a single integrated circuit. The various modules can freely be combined together into one or more integrated circuits, according to the design choice. Of course, the model shown in FIGS. 3, 5 and 8 may also be used such that the methodology of FIG. 5 can be embodied in a computer program product with executable codes stored in a computer readable medium for executing the steps of FIG. 5.

Reception Window

As shown in FIG. 6, in addition to specifying a periodicity of for example the HS-DSCH sent from the Node B (middle timeline in FIG. 6), a reception window size could be defined during which the HS-SCCH might or might not be present for fixed allocation packets. The window could be, e.g., a few TTIs (the TTI is only 2 ms in HSDPA). The UE would try to use (see step 56 of FIG. 5) the stored parameter values during the reception window. For instance, if the HS-DSCH periodicity is 20 ms (10 TTIs) and the window (RW) is 3 TTIs, then the UE would use the stored parameter values every 20 ms during 3 TTIs. If the Node B sends to this UE during this window using the stored parameter values, then no HS-SCCH would be transmitted.

FIG. 6 shows that. HS-SCCH is only transmitted when the transport format of data on HS-DSCH changes. It is shown changing (see top timeline in FIG. 6) for the $1^{st}$ transmission, for the retransmission ($5^{th}$ transmission), and for the new transmission after retransmission ($6^{th}$ transmission). It could be possible to avoid HS-SCCH transmission for the new transmission after the retransmission, if HS-SCCH for the retransmission clearly confirms that the assumed parameter values for the first transmission were correct. There is however, always some uncertainty when a retransmission is required and therefore we prefer that HS-SCCH is always sent after a retransmission. Thus HS-SCCH is not sent if the parameter values are unchanged and ACK has been received for the first transmission of the previous packet (see the bottom timeline where "A" signifies an acknowledgement sent on the uplink HS-DPCCH from the UE to the Node B).

As mentioned, FIG. 6 shows the periodicity (T=20 ms) and the reception window (RW); in the case shown, the $2^{nd}$ transmission is shown slightly delayed but still within RW and thus no HS-SCCH is needed (if all the other parameters are unchanged).

The number inside HS-DSCH shows the value of the NDI (HARQ new data indicator (1 bit)), which is normally sent on HS-SCCH, Part 2. It should be noted that NDI value changes between new transmissions deterministically and therefore no HS-SCCH is needed to tell it. Also, from the point of view of the NDI, it is safer to send HS-SCCH after every retransmission.

FIG. 7 shows the case where the channelization code for the VoIP transmission changes ($5^{th}$ transmission) or the transport block size changes ($7^{th}$ transmission) and therefore the HS-SCCH has to be sent. As shown, the transmission of HS-SCCH can be omitted for the subsequent packets if the parameters remain unchanged, according to the present invention.

Alternative 2, Fixed Allocation Using RRC Signalling

RRC (higher layer) signalling could be used to tell the default HS-SCCH parameters for each (VoIP) UE. UE would use these parameters if none of the sent HS-SCCHs is for it (thus the UE would first try to decode HS-SCCHs, as in step 50 and 52 of FIG. 5, and if none of them is for it, it will still try the default parameter values from the RRC in step 56. The RRC signalling could also tell the periodicity of the (VoIP) transmissions and the reception window: then the UE would use the default parameter values only during the reception window (e.g., 3 TTIs (=reception window) every 20 or 40 ms (=periodicity)). Thus the Node B would send HS-SCCH every time some of the parameters differ from the default values:

In the case where a re-transmission is needed (redundancy version (RV) may be different, also retransmission typically not received within receiving window)

If the size of the VoIP packet changes (transport block size (TBS) changes)

If the length of the VoIP header changes (TBS changes)

SRB or some other logical channel is transmitted (HARQ process id and TBS change) (unless fixed allocation principle is also configured for this logical channel)

If there is a need to change MCS (modulation or channelization code(s) change)

Alternative 2 (fixed allocation, RRC signalling) is a good choice if there is clearly one (or a few) default TBS (Transport Block Size). Then this (these) default format(s) can be used often. However, if there are several transport formats that are used often, then alternative 1, where the parameter values of a successful HS-SCCH/HS-DSCH reception are stored, is better.

UE Specific CRC on HS-DSCH

In both alternatives, in order to avoid false alarms (i.e., UE reads other users data and if CRC matches forwards the wrong data to higher layers where decryption should fail), it is proposed to make the CRC of the HS-DSCH UE-specific in a manner similar to that of the CRC on HS-SCCH (see, e.g., 3GPP specification TS25.212, v. 6.3.0). Then, the L1 CRC will be already failed if the intended UE is not the one trying to decode it and the error will not be propagated to higher levels.

The UE specific CRC for the HS-DSCH can be implemented, for instance, as follows. Calculate the 24 bit CRC normally as specified in TS25.212. Then XOR (i.e., add using mod 2 arithmetic), e.g., the last 16 bits of the CRC with the 16 bit UE id. Alternatively, the first 16 bits of the 24 bit CRC could be XORed with the 16 bit UE id. Furthermore, it is possible to extend the 16 bit UE id into a unique 24 bit sequence (e.g., by using some (24,16) block code) and XOR the whole 24 bit CRC with this UE specific bit sequence.

New Data Indicator (NDI)

The NDI is the only parameter whose value changes between new transmissions even if the transport format, etc., remain the same. Thus it cannot be part of the fixed allocation. As described above, this may not be a problem if HS-SCCH is always sent for retransmission and for a new transmission after retransmission (or in other words, HS-SCCH transmission is avoided only when the previous new transmission was ACKed immediately (no retransmissions)). Another possibility could be to replace NDI and RV with retransmission sequence number (RSN) in the similar way as on E-DPCCH in HSUPA. Then RSN=0 tells the first transmission and thus UE always knows whether the HS-SCCH parameter values should be stored ($1^{st}$ transmission) or not (retransmission).

Another possibility is to indicate to the UE that the HS-SCCH parameters should be stored. This could be done with a 1 bit flag added on HS-SCCH (or HS-DSCH). This flag would be set to one when the HS-SCCH parameters are such that they could be used for the next transmission (provided that the RLC PDU size etc. remain constant)

Although the invention has been shown and described with respect to a best mode embodiment thereof, it will be evident to those of skill in the art that various other devices and methods can be provided to carry out the objectives of the present invention while still falling within the coverage of the appended claims.

The invention claimed is:

1. A method for execution in user equipment, comprising:
   reading, at said user equipment, a signalling channel of a radio interface between said user equipment and a radio access network and determining whether there is any signalling information present for said user equipment, said signalling information including transport format parameters to decode data packets of a data channel received from the radio access network,
   decoding, by the user equipment, a data packet received on the data channel from said radio access network according to signalling information responsive to determining that said signaling information is present in said signalling channel for said user equipment,
   locally storing, in the user equipment, the transport format parameters from the signalling information responsive to determining that said signalling information is present in said signalling channel for said user equipment,
   decoding, by the user equipment, said data packet using previously locally stored transport format parameters responsive to determining that said signalling information is not present in said signalling channel for said user equipment, and
   delivering decoded said data packet to higher layers of the user equipment.

2. The method of claim 1, wherein said signalling information is for indicating the transport format parameters of a first transmission with subsequent transmissions using the same transport format parameters comprising said stored transport format parameters.

3. The method of claim 1, wherein said signalling channel is a high speed shared control channel that employs up to four channels.

4. A non-transitory computer readable medium having computer executable program code stored thereon for that, when executed by a processor in a user equipment, causes the user equipment to perform a plurality of operations comprising:
   read a signalling channel and determine whether signalling information for the user equipment is present, the signalling information including transport format parameters for decoding data packets at a data channel;
   decode a data packet on the data channel according to the transport format parameters in the signalling information responsive to determining that said signalling information for the user equipment is present;
   locally storing the transport format parameters from the signalling information responsive to determining that said signalling information for the user equipment is present;
   decode said data packet using the locally stored transport format parameters responsive to determining that said signalling information for the user equipment is not present; and
   deliver decoded said data packet to higher layers.

5. A user equipment comprising:
   a receiver for receiving a signalling channel and a data channel;
   a determiner, for determining whether signalling information for said user equipment is received at the signalling channel;
   a memory, for storing transport format parameters for decoding data packets received on the data channel responsive to signalling information for said user equipment being received on said signalling channel; and
   a decoder, for decoding a data packet received on the data channel responsive to signalling information for said user equipment being determined as received on said signalling channel for said data packet, and
   for using the transport format parameters previously stored in the memory to decode said data packet responsive to no signalling information for said user equipment being determined as received on said signalling channel, and
   deliver decoded said data packet to higher layers of the user equipment.

6. The user equipment of claim 5, wherein said previously stored transport format parameters are for use to decode said data packet only in configured transmission time intervals, and said configured transmission time intervals are determined by periodicity and by a reception window.

7. The user equipment of claim 5, wherein said signalling information is for indicating the transport format parameters of a first transmission with subsequent transmissions using the same transport format parameters comprising said stored transport format parameters.

8. The user equipment of claim 5, wherein said signalling channel is a high speed shared control channel that employs up to four channels.

9. The user equipment of claim 5, wherein said stored transport format parameters are indicated by said signalling from a radio resource control layer.

10. An apparatus, comprising:
    at least one processor; and
    at least one memory including computer program code configured to, with said at least one processor, cause said apparatus at least to:
      read a signalling channel and determine whether signalling information for the apparatus is present, the signalling information including transport format parameters for decoding data packets at a data channel;
      decode a data packet on the data channel according to the transport format parameters in the signalling information responsive to determining that said signalling information for the apparatus is present;
      locally storing the transport format parameters from the signalling information responsive to determining that said signalling information for the apparatus is present;
      decode said data packet using the locally stored transport format parameters responsive to determining that said signalling information for the apparatus is not present; and
      deliver decoded said data packet to higher layers.

* * * * *